No. 872,371. PATENTED DEC. 3, 1907.
H. O. & J. O. ROBERTS.
MECHANICAL FIGURE FOR PROJECTING BALLS OR THE LIKE.
APPLICATION FILED APR. 9, 1906.
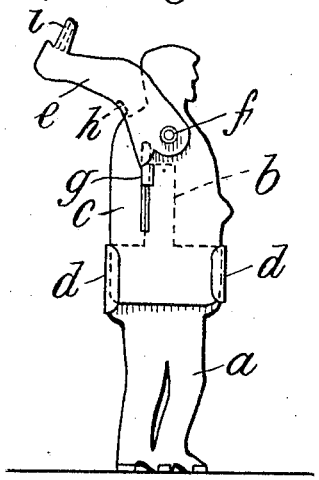
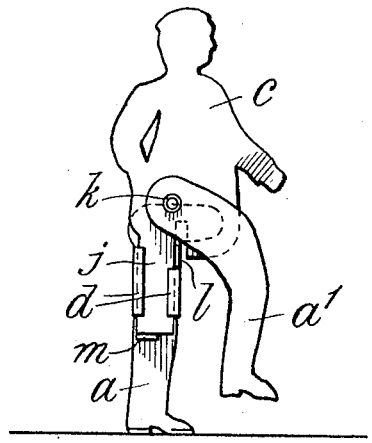
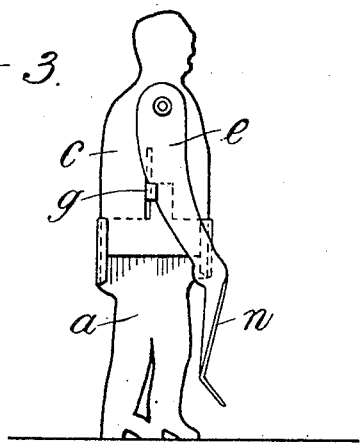

UNITED STATES PATENT OFFICE.

HARRY OWEN ROBERTS AND JOHN OWEN ROBERTS, OF GLOUCESTER, ENGLAND.

MECHANICAL FIGURE FOR PROJECTING BALLS OR THE LIKE.

No. 872,371.  Specification of Letters Patent.  Patented Dec. 3, 1907.

Application filed April 9, 1906. Serial No. 310,851.

*To all whom it may concern:*

Be it known that HARRY OWEN ROBERTS and JOHN OWEN ROBERTS, subjects of the King of Great Britain and Ireland, residing at Glevum Works, St. James, Gloucester, England, have invented certain new and useful Improvements in Mechanical Figures for Projecting Balls or the Like; and they do hereby declare the following to be a full, clear, and exact description of the invention, such as will enable others skilled in the art to which it appertains to make and use the same.

This invention for an improved mechanical figure or device for throwing kicking or otherwise projecting balls or the like, and other articles, relates to a figure or device in the form of a man or animal or it may be made without resemblance to animate forms, and consists of two parts so connected that one can slide relatively to the other and a pivoted part or parts mounted on one of the sliding parts and having motion imparted to it or them by a projection on the other sliding part.

In one way of carrying out this invention two sliding parts which may be made of sheet metal cardboard and metal or other suitable material may constitute the body and legs respectively of a human figure, and the pivoted part one of the arms of the same, the sliding parts being connected together by guide lugs, grooves or the like on one part, in which the other part, or projections formed thereon are adapted to engage. The arm may be raised above the head of the figure or may hang by the side, but is so arranged that it tends to fall by gravity into the path of a projection formed on the legs or movable lower part of the figure, this projection passes through a slot in the body part and acts as a stop to limit the sliding action of the legs or lower part relatively to the body or vice versa in one or both directions.

In another form of the invention one leg is mounted to slide relatively to the body, while the other leg is pivotally suspended on the body, and hangs in such a manner that an inclined part thereof is in the path of a projection of the sliding leg.

A number of limbs or other parts may be made to move at the same time, for instance two legs or arms, or a leg and an arm. The arms may be provided with clips or other devices for holding articles.

When the contour of the leg or arm when either straight or bent, does not provide a suitable surface for the projection to act upon to produce the desired movement, suitable lateral or other extensions may be formed thereon to coöperate with the actuating projection.

In using the device, it will be held by its body or the like, and brought down with sufficient pressure in a standing position on a table or other surface, which will cause the body to slide down the standing leg or support, and thereby bring the pivoted arm, leg or the like into contact with the projection on the sliding leg or support causing the arm, leg or the like to kick, throw or otherwise move with an energy proportionate to the pressure used, thereby propelling balls or other articles with more or less force.

In the accompanying drawings Figures 1 to 3 are side elevations of three different forms of mechanical figures constructed according to this invention.

Referring to Fig. 1. of the drawing the mechanical figure therein shown which is adapted for throwing is formed of a lower part comprising the legs $a$ and upward extension $b$ shown in dotted lines, an upper or body part $c$ arranged to slide in guides $d$ formed by bending over opposite edges of the lower part as shown, and an arm $e$ pivoted at $f$ to the body $c$. When the body $c$ is depressed in the guides $d$ the arm is raised by a projection $g$ on the part $b$ which bears against a shoulder piece on the arm having a curved or inclined edge. The projection $g$ also acts as a stop to limit the motion of the body relatively to the legs and as a guide for the part $c$. The arm falls back into its lowered position when the body is raised, a stop $h$ on the arm limiting the upward and downward movement by coming against the back of the head or shoulders respectively. A socket or clip $i$ is provided on the arm $e$ for holding small articles to be thrown or projected.

In Fig. 1 the arm is shown in the lowered position. If now it is desired to throw a ball or other article, the article is inserted in the clip or socket $i$ the feet placed on a table or other support, and the body $c$ is quickly depressed causing the arm $e$ to be jerked forward until arrested by the stop $h$ at which moment the article in the socket $i$ will be projected.

Fig. 2 illustrates a kicking figure. In this case the body $c$ has a downward extension $j$ on which a single sliding leg $a$ is mounted and pivoted with guides $d$. The other leg $a'$ is pivoted on the body at $k$ and a kicking movement imparted to it, when the body $c$ is depressed by a projection $l$ on the leg $a$. A projection $m$ formed by bending outward the lower end of the part $j$ limits the upward movement of the body relatively to the leg in the upward direction by coming against the guide $d$ while the projection $l$ limits the downward movement of the body.

In use, the body $c$ of the figure is taken hold of and raised and the leg $a'$ falls into its lowest position. The figure is then placed with its leg $a'$ in line with and at a short distance from the ball to be kicked. If now the body $c$ be depressed while the leg $a$ rests on the table or support, the pivoted leg will kick and project the ball.

In Fig. 3 a figure holding a cricket bat, club, stick or the like $n$ for striking a ball is shown and comprises legs $a$ and body $c$ as in Fig. 1, but in this case the arm $e$ hangs by the side of the figure and is caused to swing forward to make a stroke with the bat or like by the projection $g$ acting on the curved rear edge of the arm, when the body $c$ is depressed or caused to slide downwards on the legs.

What we claim and desire to secure by Letters Patent is:—

1. A mechanical figure or device for throwing kicking or otherwise projecting balls or the like and other articles consisting of two parts so connected that one can slide relatively to the other, and a pivoted part or parts mounted on one of the sliding parts and having motion imparted to it or them by a projection on the other sliding part substantially as described.

2. A mechanical figure or device for throwing, kicking or otherwise projecting balls or the like and other articles, consisting of a lower leg part, integral guides on the edges of the leg part, an upper body part mounted to slide in said guides, a pivoted part mounted on the body and adapted to throw or otherwise project a ball or the like, and a stop on the leg part arranged to actuate the pivoted part when the body part is depressed.

3. A mechanical figure or device for throwing, kicking or otherwise projecting balls or the like and other articles, consisting of a lower leg part, integral guides on the edges of the leg part, a slotted upper body part mounted to slide in said guides, a pivoted part mounted on the body adapted to throw or otherwise project a ball or the like, and a stop on the leg part arranged to work in the slot in the body part and to actuate the pivoted part substantially as described.

In testimony whereof we have affixed our signatures, in presence of two witnesses.

HARRY OWEN ROBERTS.
JOHN OWEN ROBERTS.

Witnesses:
WILLIAM WYNDHAM VANN,
CHARLES ARCHIBALD BRETHERTON.